United States Patent
Bedi et al.

(10) Patent No.: US 9,665,930 B1
(45) Date of Patent: May 30, 2017

(54) SELECTIVE EDITING OF IMAGES USING EDITING TOOLS WITH PERSISTENT TOOL SETTINGS

(71) Applicant: Adobe Systems Incorporated, San Jose, CA (US)

(72) Inventors: Ajay Bedi, Noida (IN); Sourabh Gupta, Noida (IN); Saurabh Gupta, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 14/937,009

(22) Filed: Nov. 10, 2015

(51) Int. Cl.
*G06K 9/54* (2006.01)
*G06T 5/20* (2006.01)

(52) U.S. Cl.
CPC .................................... *G06T 5/20* (2013.01)

(58) Field of Classification Search
CPC . G06T 5/20; G06T 11/60; G06T 19/20; G06T 2219/20; G06T 2219/2012; G06K 9/6217; G06K 2009/00489; G06F 3/048–3/04886; G06F 3/1201–3/1211; G06F 3/1242; G06F 3/125; G06F 3/1268; G06F 3/1272; G06F 3/1287; G06F 8/33; G06F 17/211; G06F 17/24–17/248; G06F 17/3028; G06F 17/30268; G06F 17/30525; G06F 17/3089–17/30893; G06F 19/321; G06F 2221/074; G06F 2221/0768; H04L 12/1822; H04L 12/185; H04L 67/14–67/148; H04N 1/00; H04N 1/00161–1/00167; H04N 1/0044; H04N 1/00456; H04N 21/47205; G06Q 10/101–10/103; G06Q 30/0621; G06Q 50/01; G11B 15/1875; G11B 27/00–27/06
See application file for complete search history.

(56) References Cited

U.S. PATENT DOCUMENTS

| | | | | |
|---|---|---|---|---|
| 7,103,230 | B1 * | 9/2006 | Jam | H04N 1/32101 358/452 |
| 7,167,173 | B2 * | 1/2007 | Balmelli | G06T 7/0053 345/419 |
| 7,194,489 | B2 * | 3/2007 | Bentley | G06F 17/30144 |
| 8,533,593 | B2 * | 9/2013 | Grossman | G11B 27/034 715/255 |
| 2008/0013916 | A1 * | 1/2008 | Sharpe | G11B 27/034 386/278 |
| 2012/0331402 | A1 * | 12/2012 | Hon | G06F 17/30058 715/756 |

(Continued)

*Primary Examiner* — Jose Couso
(74) *Attorney, Agent, or Firm* — Finch & Maloney PLLC (57) ABSTRACT

Examples are directed to selective editing of digital images using editing tools having persistent tool settings. A source image is opened as a target image in an image editing application. Once opened in the image editing application, the target image includes a plurality of image layers. Visual elements of the target image file are then edited using tools in the image editing application. For each tool used, a tool identifier and the relevant tool settings are saved and associated with the corresponding layer in a target image file. Upon closing and later re-opening the target image file, the saved tool identifier and tool settings are presented for display for further image editing in subsequent user sessions.

16 Claims, 8 Drawing Sheets

(56) References Cited

U.S. PATENT DOCUMENTS

| | | | |
|---|---|---|---|
| 2013/0218829 A1* | 8/2013 | Martinez | G06F 21/6272 707/608 |
| 2014/0096029 A1* | 4/2014 | Schultz | G06F 3/0484 715/747 |
| 2015/0180983 A1* | 6/2015 | Hitomi | H04L 67/306 709/203 |

* cited by examiner

SELECTIVE EDITING OF IMAGES USING EDITING TOOLS WITH PERSISTENT TOOL SETTINGS

TECHNICAL FIELD

The present disclosure relates generally to selectively editing digital images. Specifically, the present disclosure is directed to selective editing of digital images using editing tools with persistent tool settings.

BACKGROUND

Conventional image editing applications generally enable users to edit images and save the edited pixel data. The number of possible edits to an image is vast. As the sophistication of image editing applications has increased, the number of tools, corresponding tool settings, and the diversity in visual effects applied by the tools has also increased. Furthermore, some image editing applications can support as many as 50 to 100 distinct layers (or more) within a single image, each of which can be used to apply a visual effect to the image. However, the identities of the tools and corresponding tool settings used to edit the images are not saved. This inability to save and restore the tool identities and corresponding tool settings used to edit an image is inconvenient because of the very high number of permutations of tools, tool settings, and layers in a single image. This makes it difficult to recreate a visual effect applied to the image in a previous user session.

The figures depict various embodiments of the present disclosure for purposes of illustration only. Numerous variations, configurations, and other embodiments will be apparent from the following detailed discussion.

DETAILED DESCRIPTION

One feature of digital images is that they can be processed, enhanced, or otherwise manipulated (referred to collectively herein as "editing") using an image editing application. This editing is typically accomplished by opening an as-captured digital image (referred to as a "source image" herein) using an image editing application. Once opened in the image editing application, the as-captured digital image source image is referred to as a "target image." The application enables a user to generate one or more "layers" from the source image and other images or templates available to the application, each of which may be edited using a "tool." A layer is an array of pixel data of the target image that has approximately the same dimensions as the source image. Tools of an image editing application are configured to apply a particular visual effect to a layer of a target image. Typical image editing applications enable users to save edited target image files (and the constituent layers therein), but only the individual pixel values of an edited target image are saved. Such image editing tools do not enable saving of the identities of the tools used to edit the images or the corresponding tool settings. As mentioned above, the inability to save the tool identities and tool settings is problematic because the number of tools and corresponding tool settings used to edit one or more of as many as thousands of layers in an image make it nearly impossible or otherwise very difficult and time consuming (e.g., trial and error) to recreate a previously applied visual effect. This is because there are numerous relevant settings available for a given tool and each of those settings has a broad range of possible set-points or options. The challenges of recreating a visual effect in a subsequent user session are compounded because image editing projects are often shared between different editors and/or can take days or weeks to complete.

Thus, and in accordance with an embodiment of the present disclosure, techniques are disclosed for selectively editing digital images using editing tools that have persistent tool settings. As used herein, persistent means that the tool settings used to create one or more image effects are stored in a non-volatile memory or otherwise remain accessible for future reference in any subsequent user session.

As described above, upon opening a source image in an image editing application, the source image is then identified as a target image that is configured for editing in an image editing application. The image editing application enables a plurality of layers in the target image file to be created. Each layer can include a subset of visual elements in the source image and/or be used only to apply a new visual effect to underlying layers. These visual elements in the layers are then edited using tools in the image editing application. As described below in more detail, for each tool used, a tool identifier and the relevant tool settings are saved and associated with the corresponding layer in a target image file. Upon closing and later re-opening the target image file in a subsequent user session, the saved tool identifier and tool settings are presented for display so that a user may use them for further image editing in the separate user session.

One example benefit of some embodiments of the present disclosure includes facilitating the re-application of visual effects upon re-opening the file in subsequent user sessions by storing tool identities and settings with an edited image file for subsequent reuse. This facilitates the sharing of user files between users and/or between different user sessions. Another example benefit of some embodiments of the present disclosure includes improving consistency and quality of edited images by enabling an editor to identify each tool and each corresponding tool setting used to previously edit an image even after that previously edited image has been saved, closed, and later re-opened in a subsequent user session. In some embodiments, a given layer created using one or more tools can be saved as a template for future use, wherein the setting of each tool used to create that layer can be recalled when the template is opened or otherwise activated. Thus, a template that has a broad applicability can be created and saved in a favorites section or template library, and later accessed and applied to other image editing user sessions. The tool settings of that template remain accessible in a user interface (e.g., via a side-panel for that layer or other suitable user interface) and can therefore be readily fine-tuned to meet the needs of a given image editing project. Note, however, that the image editing process is more streamlined, as the user need not completely recreate all tool settings needed, as those base tool settings are provided with the previously saved layer/template.

For clarity of explanation, as indicated above, a layer is an array of pixel data coextensive with the source image. In some embodiments, a layer contains a subset of the image data of the source image. A layer may also be a blank layer independent of the source image and to which image components or other features are added, such as an overlay or template that can be added to a source image layer. In a more general sense, a layer is any layer in an image that can be acted on by one or more tools. The layer may include, for example, an array of pixels, wherein some pixels in the array are transparent and some present one or more visible features (e.g., color, opacity, texture, luminance, chrominance). Common tools used to apply a visual effect to pixels in an image or a layer within the image include, for example, "brush" tools each of which applies colors and textures or other visual feature (specified using one or more paintbrush tool settings) in a different artistic style (e.g., impressionist, wet media), and a "stamp" tool that applies a single discrete pattern to the target image for each actuation of the stamp tool, the pattern being specified using one or more corresponding stamp tool settings, and others.

Source Images and Target Images

Figure 1A:
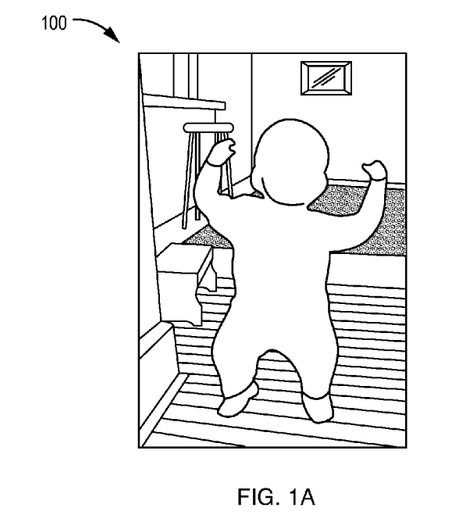
FIG. 1A is a schematic example source image captured using a digital image capture device, in accordance with an embodiment of the present disclosure.

FIG. 1A illustrates a source image 100 as captured by an image capture device. As shown, the image 100 includes an image of a child standing on a floor near a wall. A table appears in the background of the image 100. As described above, the source image 100, as will most source images captured by an image capture device (e.g., a digital camera) includes only a single image layer.

Figure 1B:
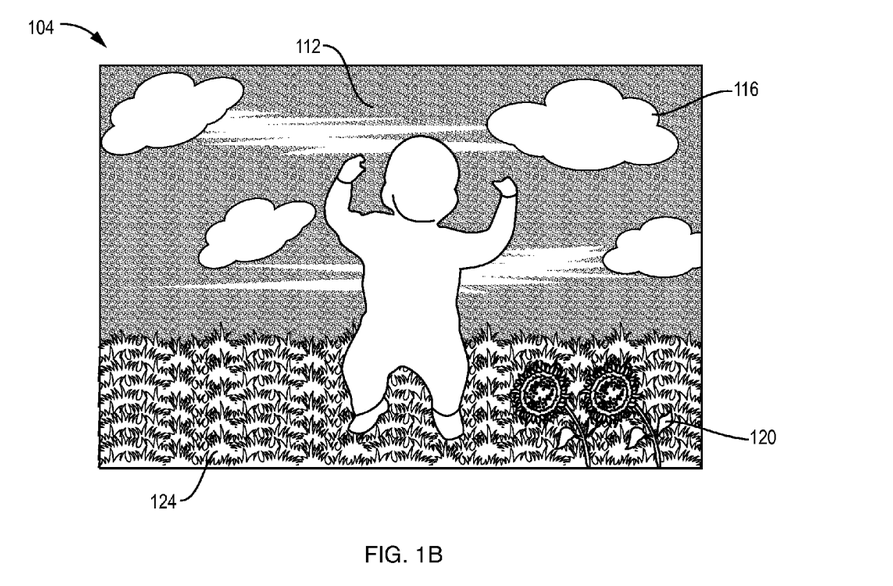
FIG. 1B is a schematic example of a target image including a plurality of image layers, one layer of which includes a portion of the source image shown in FIG. 1A, in accordance with an embodiment of the present disclosure.

FIG. 1B illustrates an example target image 104. The target image 104 has a plurality of layers, each of which has been edited. A detailed explanation of the target image 104 is presented below in the context of FIGS. 4A-D. The example target image 104 is generated by opening the source image 100 using an image editing application. Example image editing applications include ADOBE PHOTOSHOP®, AVIARY PHOTO EDITOR®, PAINT.NET, GIMP, among others, although any number of other layer-based image editing application can benefit from the techniques provided herein, as will be appreciated. As shown, the image of the child from the source image 100 has been extracted and included as an element of the target image 104. The other elements appearing in the source image, namely the floor, the wall, and the table, have been removed from the target image 104.

The target image 104 image also includes a sky image 112, cloud images 116, flower images 120, and a grass image 124. Each of these has been generated and applied in the target image 104 in a plurality of distinct image layers. Using a plurality of image layers enables generation of a composite image, such as the one illustrated in target image 104, as well as application of more subtle editing techniques. As described above, each layer is coextensive with the entire frame of the target image 104. However, some pixels within each layer are transparent, which then allows images of an overlapping layer to be visible. For example, in the target image 104, the image layer that includes the flower images 120 is transparent for all pixels except those used to create the flower images 120. This enables, for example, the layer containing the grass image 124 to be visible even though these two image layers overlap. This coordination of transparent portions of each layer applies to all of the layers of the target image 104.

Example Methods

Figure 2:
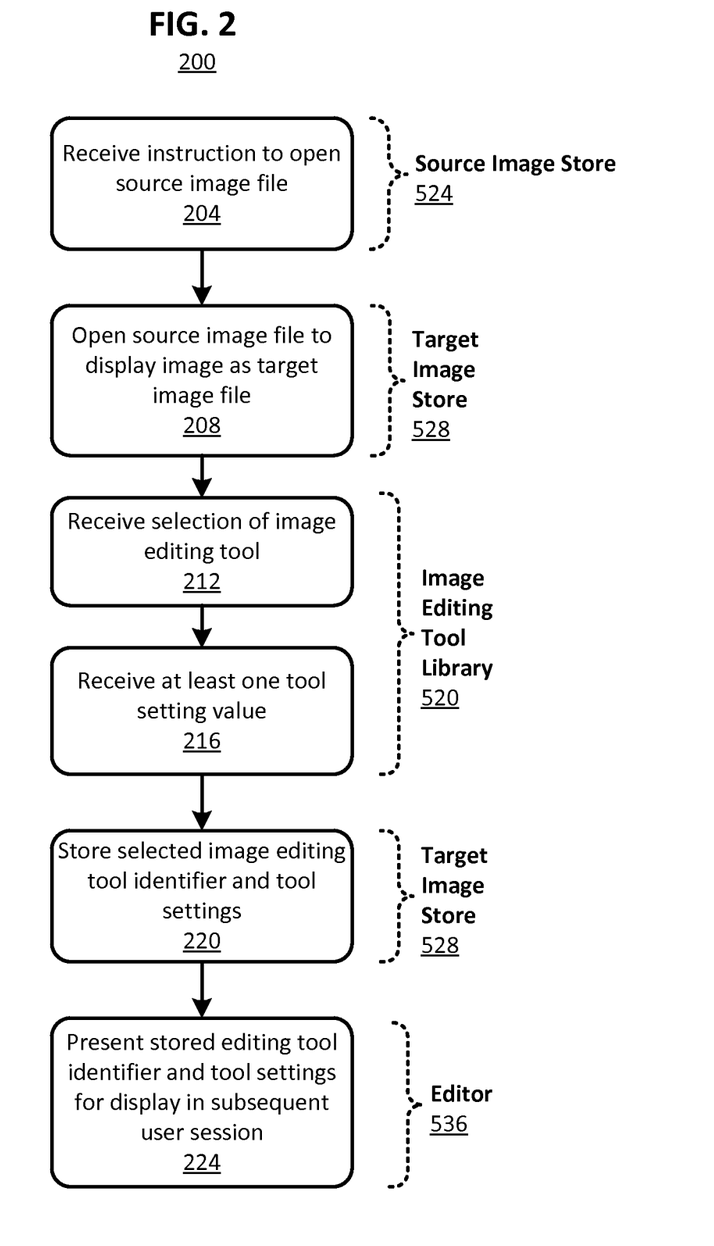
FIG. 2 is a flow diagram illustrating a method for generating a target image having a plurality of layers for which tool identifiers and corresponding tool settings are stored, in accordance with an embodiment of the present disclosure.
Figure 3:
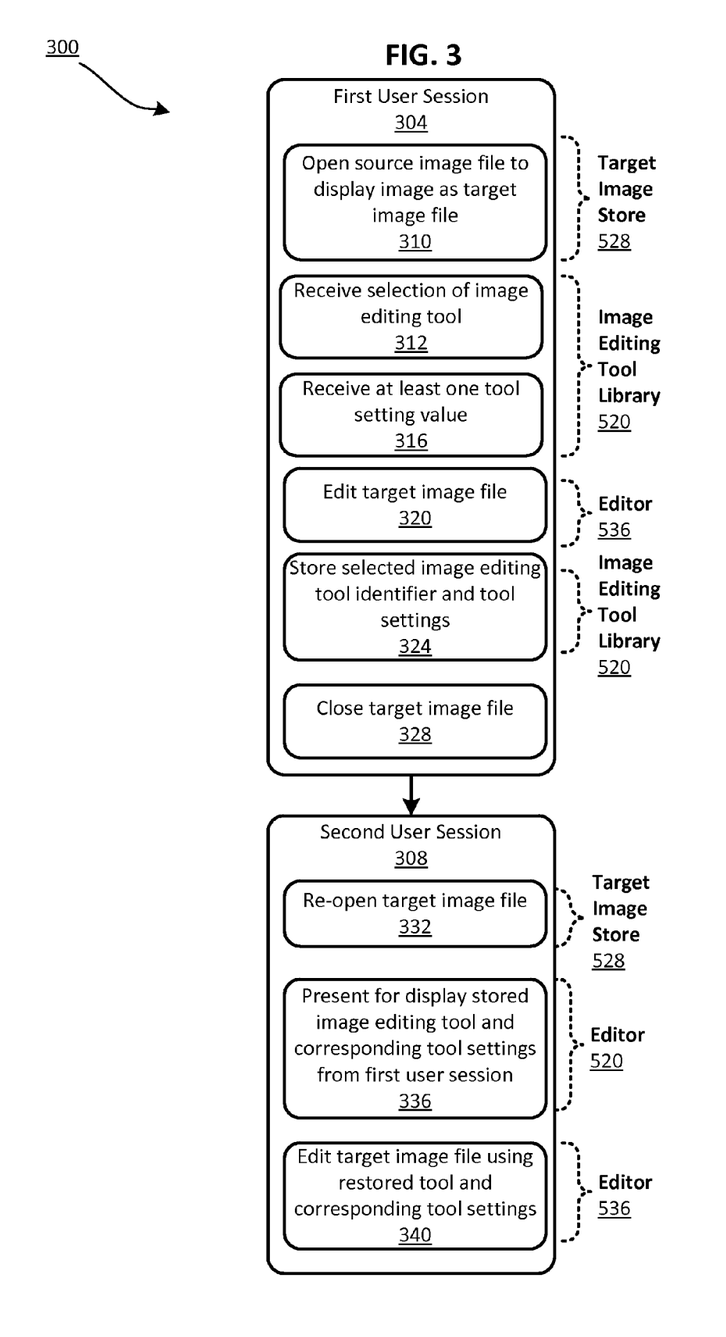
FIG. 3. is a flow diagram illustrating a method for generating a plurality of layers, editing a target image using one or more image editing tools, associating saved tool identifiers and corresponding tool settings with the image file, and restoring the tools and tool settings previously used, in accordance with an embodiment of the present disclosure.

FIGS. 2 and 3 illustrate example methods for generating target images, such as the one shown in FIG. 1B, and also methods for storing image editing tool identifiers and corresponding tool settings associated with a layer, and presenting the stored tool identifiers and tool settings for use in a subsequent user session. The example methods are then described in the context of an example target image shown in FIGS. 4A-D.

FIG. 2 is a flow diagram illustrating a method 200 for generating a target image having a plurality of layers, storing tool identifiers and corresponding tool settings used to edit layers of the target image and present the stored tool identifiers and settings for display in a subsequent user session, in an embodiment of the present disclosure. In the method 200, an instruction is received 204 by an image editing application to open a source image file corresponding to a source image. Source images are, in some examples, captured by digital image capture devices including digital cameras, cameras associated with mobile computing devices, scanners, and the like.

Source image files are generally files composed of pixel data and source image file metadata. The pixel data generally includes a pixel coordinate identifying a location in an image frame and an identifier of a color to be rendered at each pixel coordinate in the image frame. The color identifier can be any of a number of bits, depending on the number of colors within a palette. The source image file metadata can include information generally associated with image files, such as date and time of capture, geographic location of capture, a device identifier of the device used to capture the image, and other similar information. In some examples, the source image file metadata also includes a color palette definition (alternatively known as a color look-up table) that is used to reproduce the color identified at each pixel coordinate on a display of a display device. For example, in a four-bit pixel data scheme, each individual pixel has a four-bit color identifier that identifies one of sixteen possible colors to be rendered. The color palette definition translates the four-bit color identifier into the color to be rendered on a display of a display device.

Responsive to the received instruction, the source image file is opened 208. Upon opening 208 the source image file in an image editing application, the source file is converted to the target image file. The target image file is formatted to support a plurality of layers that are used, collectively, for editing the image and rendering of a composite image of the plurality of layers, as illustrated in FIG. 1B. The target image file is also configured to include metadata for each image layer of a plurality of layers in the image file. This metadata includes information describing each image editing tool used to edit the target image file and each corresponding tool value, as will be described below in more detail.

Once the target image file is open within the image editing application, a selection of an image editing tool is received 212. Each editing tool is configured to apply a visual effect to the target image file. These effects include applying lines or bands of color, applying an opaque, translucent, or transparent pattern, sharpening or blurring portions of the target image received from the source image file, and otherwise adding, removing, and editing images in the target image file by manipulation of pixel data.

Examples of image editing tools include, but are not limited to, various brush styles (e.g., impressionist, wet media, dry media), pattern applications, drawing tools (e.g., pen, highlighter, pencil, charcoal), and other visual effects (e.g., blur, sharpen, color change) used to alter the pixel data of the source image file.

Each tool is associated with a plurality of tool settings. One or more tool setting values are received 216 after the selection 212 of an editing tool. The tool settings prescribe visual effect to be applied to a layer by a particular selected 212 image editing tool. For the example of a selected brush tool, the corresponding brush tool settings include, but are not limited to, a "width" of a brush stroke (i.e., a number of pixels to which the brush effects are applied for each pass of a brush), a color to be applied by the brush, an opacity (i.e., whether the color pixels are opaque or whether pixels in an overlapping layer are visible through the layer to which the brush is applied), and a degree of alignment (i.e., whether the brush stroke is aligned to a Cartesian grid applied to an image frame or whether the stroke is applied to pixels based on a path of the brush tool).

Other tools settings include selectable styles to be applied to the pixels. Continuing with the brush tool example, a setting is used in some examples to select a type of "bristle" for the brush. Examples of possible bristle types include natural, synthetic, metallic, stiff, soft, long, short, and combinations thereof. This setting then produces a modification of pixel data in the target image file reminiscent of a corresponding physical brush type. For example, a "natural" and "soft" bristle will produce a broader "stroke" of affected pixels (i.e., extending beyond the selected brush width with irregular variation in the amount of the extension over the stroke) and a more uniformly colored stroke. This is in contrast to a "metallic" bristle in which the brush stroke will be narrower (corresponding more closely to the selected width of the brush), and may include color variations in which the locations between individual "bristles" have a lower color saturation that those locations that correspond to the "bristles" themselves.

Other examples of tool settings include the type of "media" applied and a color palette. Example media include oil paint, water color, highlighter, crayon, pastel chalk, charcoal stick, and others. Color palettes include, as examples, pastel colors, primary colors, and those directed to specific colors (e.g., shades of blue, shades of red).

Still other examples of selectable styles include an artistic style. For example, selecting "impressionist," "modern," "renaissance," or "post-modern" will apply a set of settings that edit a plurality of pixels so as to mimic the selected artistic style. For example, selecting "impressionist" will produce edits in the target image with blurred boundaries, a reduced level of detail, and pastel color selections.

A unique identifier of the selected tool and the various corresponding tool settings are stored 220 as metadata of the target image file and associated with a corresponding layer of the target image, as described below in more detail. In some examples, the unique tool identifier and the corresponding tool settings for each edit made to each layer of a target image file are saved as metadata associated with the target image file. In some examples, the data describing the tools and tool settings used to edit the various layers of the image are saved as XML format metadata. Regardless of the format used to save the tool identifiers and corresponding tool settings, the saving of this information with the target image file facilitates many of the benefits described above. That is, once saved, the same tools and tool setting are identified and restored upon re-opening the file in a subsequent user session, whether by a same user or by a different user. This enables complicated or sophisticated editing projects to be completed over the course of days and/or by a plurality of editors conveniently, without successive editors spending time attempting to recreate the visual effects added to a target image file by a preceding editor.

Continuing with the method 200, after storing the selected tool identifier and corresponding tool settings, the target image file can be closed. In a subsequent user session, however, the stored (i.e. persistent) tool identifiers and corresponding tool settings previously used to edit a target image are presented for display 224 in the subsequent user session. This conveniently facilitates the applications of the same visual effects applied in the previous user session, without requiring the user to empirically determine the previously used tool and settings.

FIG. 3 illustrates another example method 300 for using persistent tools and tool settings, in an embodiment of the present disclosure. To highlight the persistence of the tool identifiers and corresponding tool settings, the method 300 is represented as including two meta-steps 304 and 308, each of which is associated with a separate user session. In this example, the first user session 304 and the second user session 308 are conducted by either different users at different times or by the same user at different times, either of which is a different user session. Regardless, this depiction highlights the feature of persistent tool identifiers and corresponding tool settings across different user sessions facilitating some of the advantages described above.

The first user session 304 follows elements of the method 200 described above in the context of FIG. 2. That is, in the first user session 304, a source image file is opened 310 as the target image file, a selection of an image editing tool is received 312, and at least one tool setting is received 316. A layer of the target image file is edited 320 using the selected image editing tool and the corresponding tool settings.

As described above, a difference of embodiments of the present disclosure is not only the storage of the as-edited pixel data, but also storage of a tool identifier and the corresponding tool settings used to edit a target image file. This storage facilitate presentation of the previously used tools and corresponding tool settings so that they can be re-used at a later time, by another user, or both.

As shown in FIG. 3, the method 300 includes storing 324 the selected image editing tool identifier and corresponding tool settings. Because a user may actually use multiple settings for one tool, multiple tools, or both in any of a plurality of layers associated with a target image file, the tool identifier and corresponding settings are stored on a per pixel, per layer basis as metadata associated with the target image file. This can be accomplished by storing pixel coordinates that prescribe boundaries within which a particular tool and corresponding tool setting was used in a layer. It can also be accomplished by storing pixel coordinates and associating the tool and corresponding tool setting used to modify the pixel data of a layer. Other means of storing a coordinated set of pixel data with the identified tool and corresponding tool setting are also possible.

Once the metadata is saved, the first user session 304 ends with closing 328 the target image file. Pseudo-code illustrating the metadata identifying the tool and associating settings follows, as an example.

```
<layer identification>
    <tool identifier>
        <id> Pencil Tool
        <Tool Settings>
            <Size> 10 pixels
            <Mode> 1
            <Opacity> 0.3
            <Advanced Settings>
                <Scatter> None
                <Fade> None
                <Spacing> 1
                <Hardness> High
                <Roundness> Low
```

Second user session 308 begins by reopening 332 the target image file previously edited and saved in the first user session 304. Upon reopening 332 the target image file, the identity of each tool and each corresponding tool setting is presented for display 336 for each image layer within the image file. As indicated above, the identity of each tool used and the corresponding settings are saved for each edited pixel within each layer (as XML data in some examples), which in turn facilitates use of the same tools previously used to apply the same visual effects in a subsequent user session. This facilitates sharing and collaborating between users because the tool identities and settings persist across user sessions even though the target image file is periodically closed. The second user session 308 is shown to end with the editing 340 of the target image using the restored tool and corresponding tool settings.

In some examples, different tools, different tool settings, and combinations thereof are also used in the second user session 308. In this example, the tool identities and tool settings are selected, applied to the target image file, and stored as shown and described in the context of the method 200 and in the first user session 304 of the method 300.

Example Use Case

FIGS. 4A-D illustrate an example application of the methods described above in the context of FIGS. 2 and 3. Each of FIGS. 4A-D illustrate a layer of target image 104 and the successive editing of each layer used to construct the target image 104. As shown in FIG. 1B, the target image 104 is a composite of the various individual layers edited according to some embodiments of the present disclosure and overlayed with one another. In each of FIGS. 4A-D, a tool summary displaying a tool identifier and corresponding tool settings is presented as an example embodiment of a user interface in a subsequent user session that communicates the tool identifier and settings used in a prior user session to apply a visual effect to a layer of a target image file.

Figure 4A:
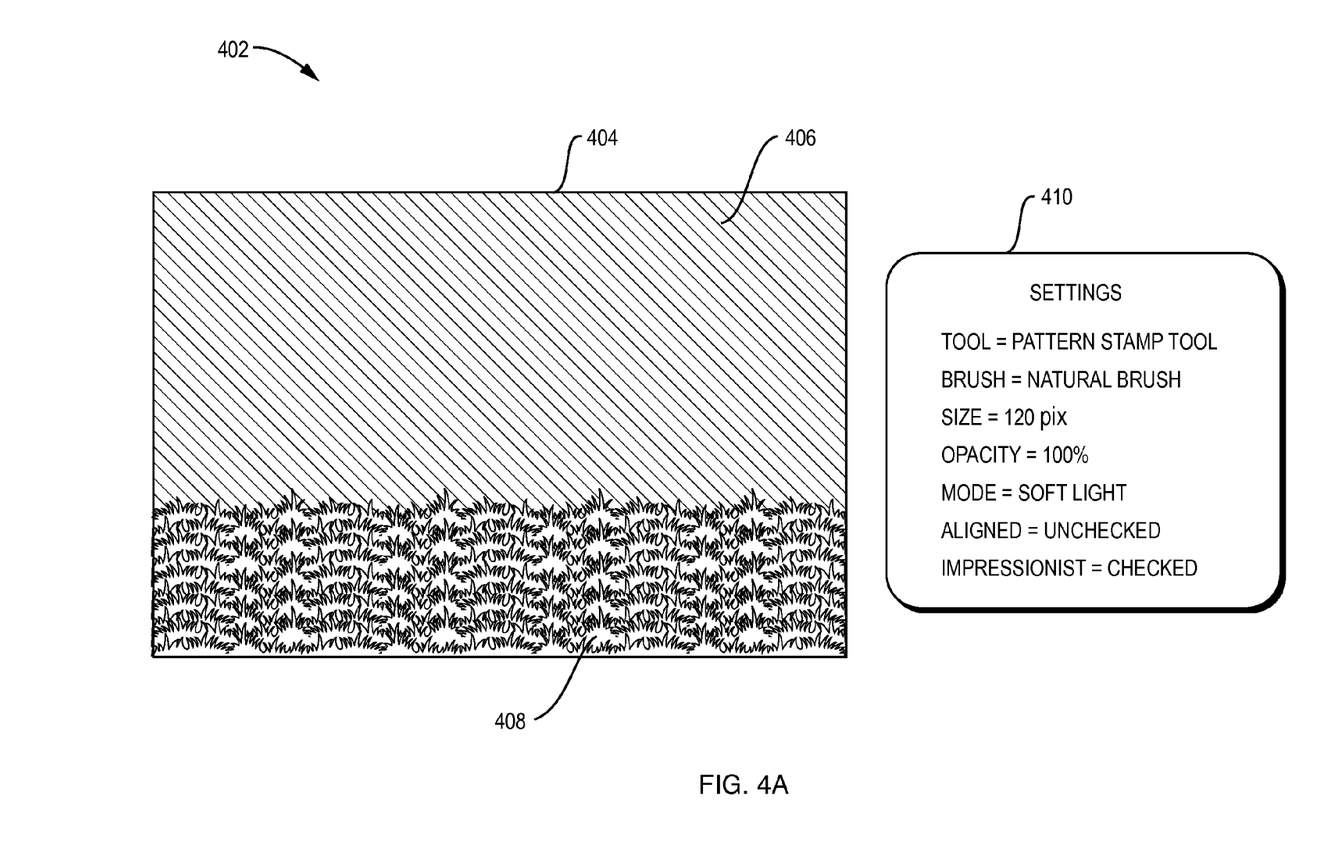
FIGS. 4A-D schematically illustrate a plurality of layers, each of which is generated using a tool and corresponding tool settings, which are saved and associated with the corresponding layer, in accordance with an embodiment of the present disclosure.

FIG. 4A illustrates a layer 402 that includes a frame 404 of the target image 104 and a grass image 408. The frame 404 is coextensive with the frame of the target image 104. The frame 404 is defined by the number of pixels in each axis of a Cartesian (i.e., x-y) coordinate system, but other coordinate systems may also be used to define a frame size of the target image 104. This defined frame size of the target image 104 is selected independently from the frame size of the source image 100. Generally the frame size of the target image 104 is at least the size and dimensions of the portion of the image selected from the source image 100.

The layer 402 shown in FIG. 4A does not include any image content (i.e., pixel data) originating from the source image 100 other than frame dimensions, but rather includes transparent portion 406 and grass portion 408. Upon creation of the layer 402, which initially is entirely transparent, the grass portion 408 is applied to a portion of the layer 402 using a pattern stamp tool having the tool settings shown in corresponding tool summary 410.

The tool summary 410 is an example user interface displaying a tool identifier ("Tool=Pattern Stamp Tool") and corresponding tool settings as presented in a user session subsequent to the user session in which the tool and settings were used to edit the layer 402. As shown, the tool settings associated with the grass portion 408 include identification of the tool used to generate the grass pattern ("pattern stamp tool") and corresponding settings, which include a "natural brush," a stamp size of 120 pixels, an opacity of each stamp of 100%, applied with a "soft light" mode, no alignment between adjacent stamps (i.e., the borders of the stamps are not aligned with one another or with an underlying coordinate grid), and an "impressionist" style. As described above, all of this data is stored as XML metadata in this example. As described above, the tool identifier and tool settings are used in the subsequent user session to reproduce the same visual effects (i.e., the grass portion 408) added to the layer 402 in a prior user session, without requiring time consuming empirical experimentation to identify the correct tool and settings in the subsequent user session.

Figure 4B:
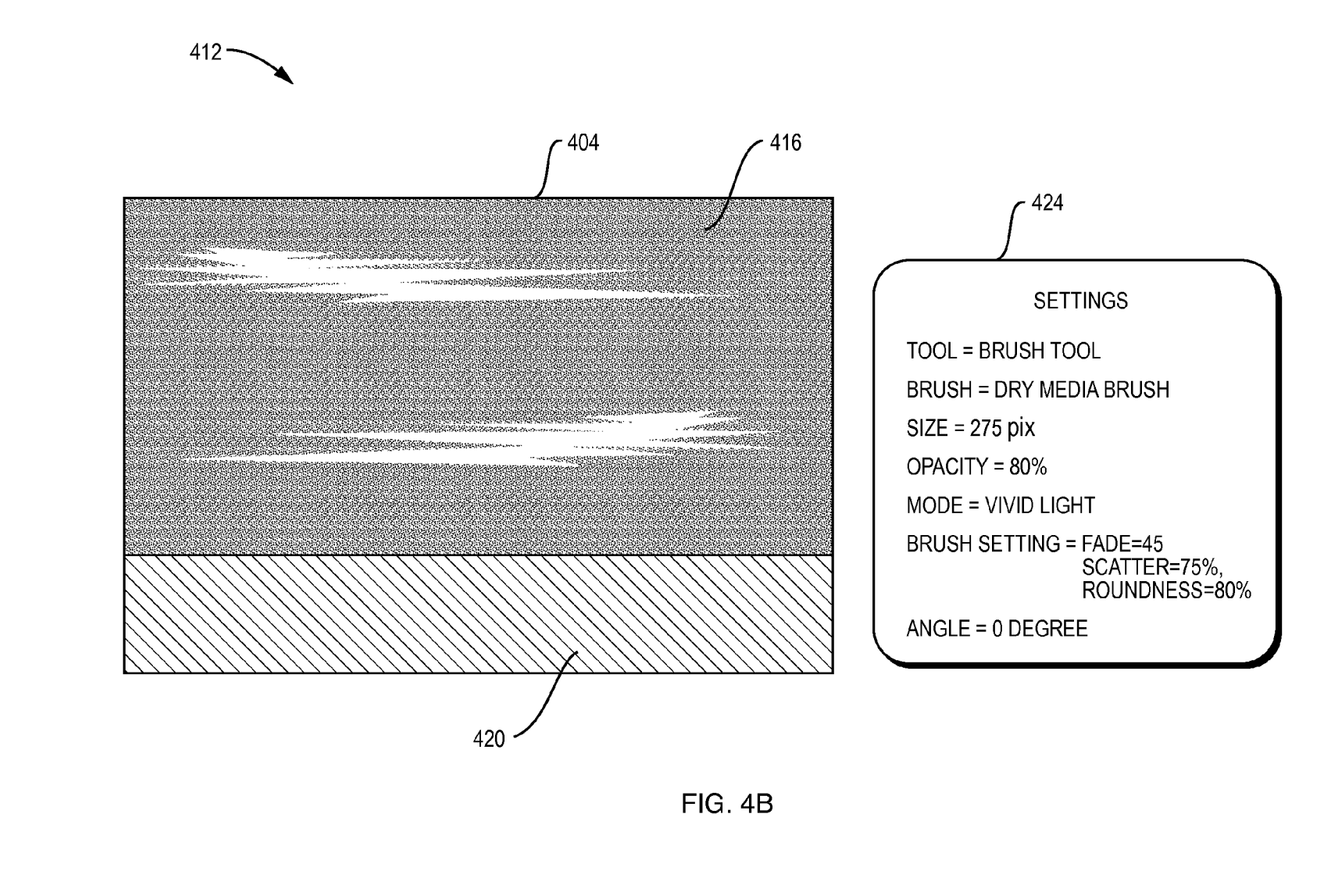

Similarly, as shown in FIG. 4B, the layer 412 (with frame 404) includes a sky image 416 and a transparent portion 420. A tool summary 424 presented for display in a subsequent user session identifies the tool and its corresponding settings used to generate the sky image 416 in the layer 412 in a previous user session. Specifically, the tool summary 424 identifies the tool as a brush tool, and the settings include a dry media brush having a brush stroke size of 275 pixels, an opacity of 80%, a mode of "vivid light," among others.

Figure 4C:
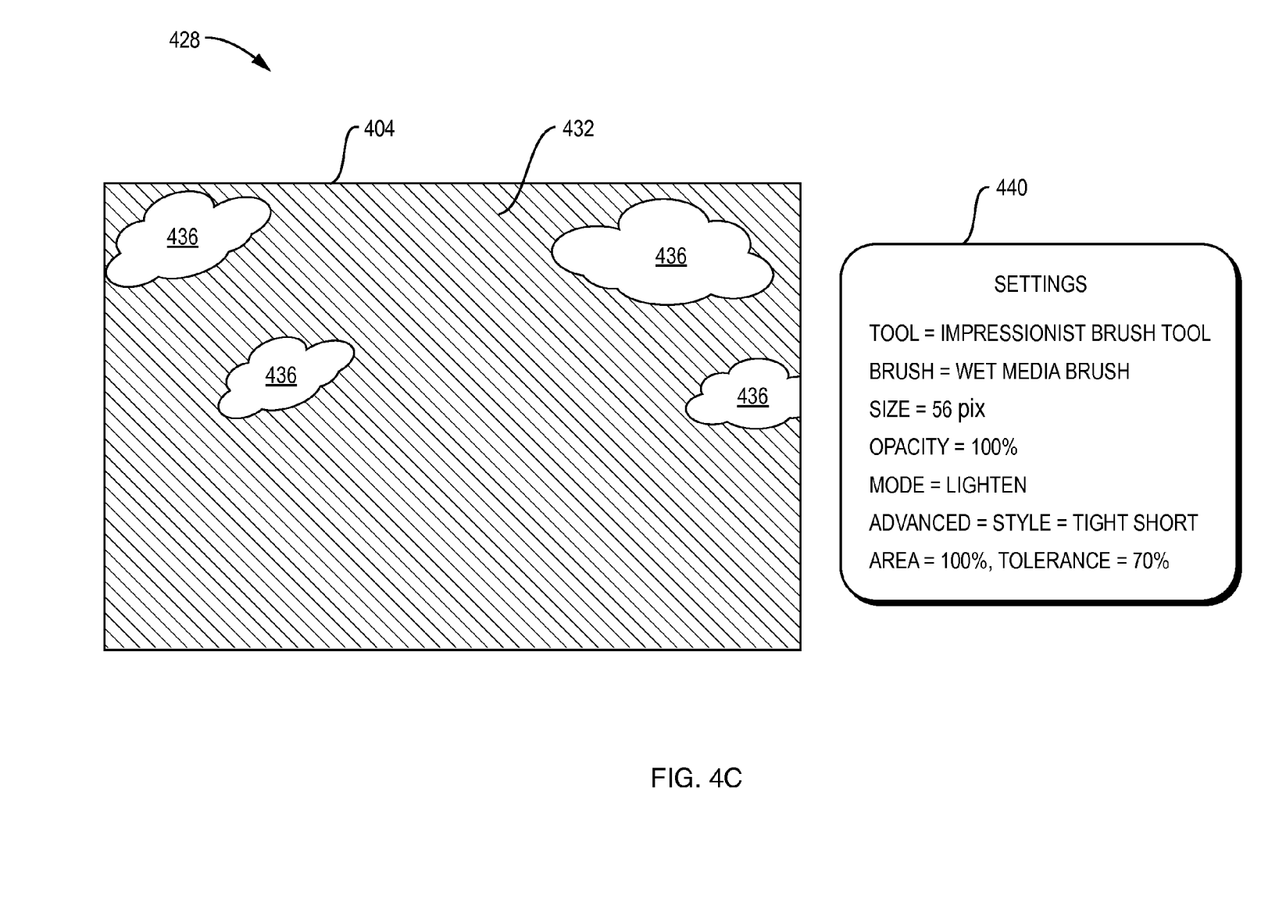

FIG. 4C illustrates a third layer 428 having a frame 404. The third layer 428 includes a transparent portion 432 and a plurality of clouds 436. A tool summary 440 identifies the tool and the corresponding tool settings used to generate the clouds 436 in the third layer 428 in a prior user session. Specifically, the tool summary 440 identifies the tool used to generate the clouds 436 as an impressionist brush tool. The corresponding settings identified are a wet media brush, a brush stroke size of 56 pixels, an opacity of 100%, a "lighten" mode, an advanced style of "tight short" an area of 100% and a tolerance of 70%.

Figure 4D:
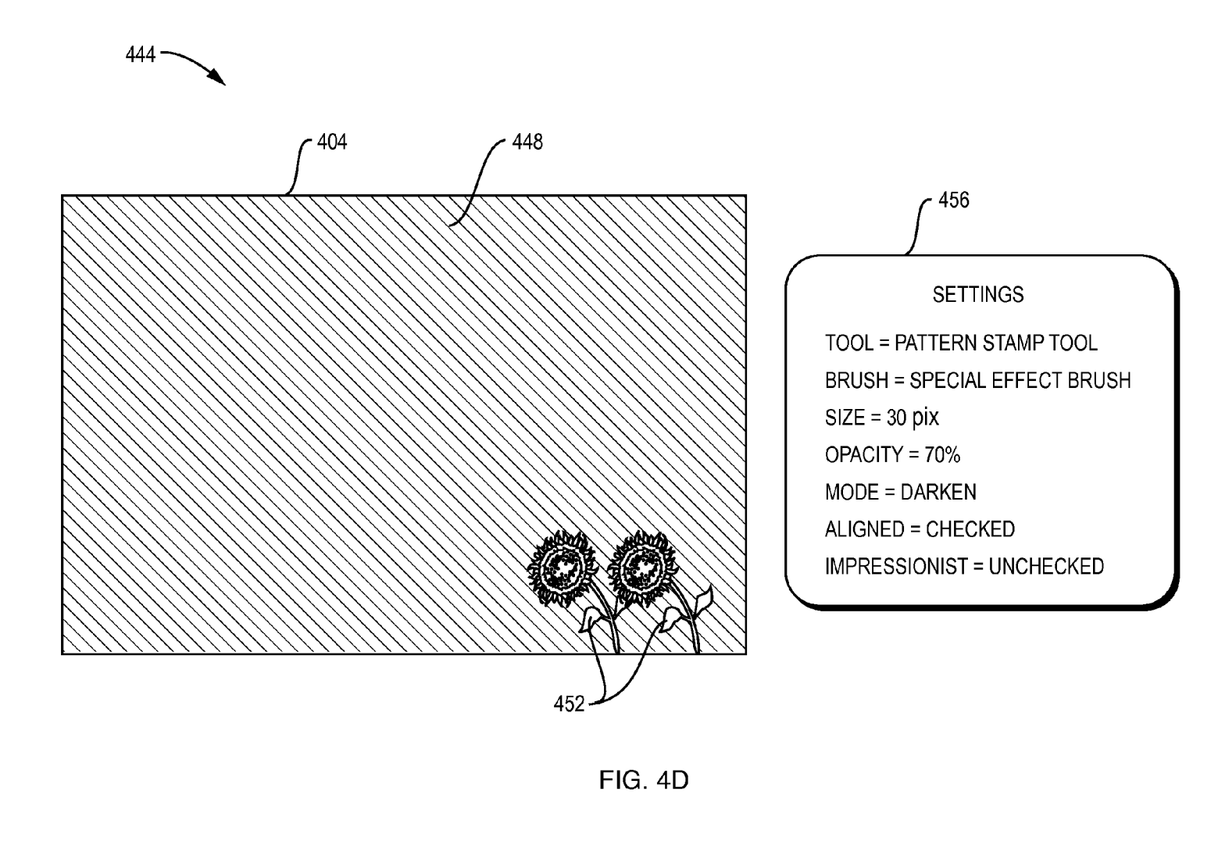

FIG. 4D illustrates a fourth layer 444 having the frame 404, a transparent portion 448 and sunflowers 452. A tool summary 456 identifies the tool and the corresponding tool settings used to generate the sunflowers 452 in the fourth layer 444 in a prior user session. Specifically, the tool summary 456 presented for display identifies the tool used to generate the sunflowers 452 as a pattern stamp tool. The corresponding settings identified are a wet media brush, a brush stroke size of 56 pixels, an opacity of 70%, a "darken" mode, and an alignment to an underlying grid of the sunflower images.

Upon generation, editing, and compilation of the layers 402, 412, 428, and 444, the final target image 104 shown in FIG. 1B is generated. While the various tool settings are described above in detail, these specifics are incidental to the benefits of the persistent tool identifiers and tool settings saved as metadata with the target image file on a per layer basis, as described above.

Example Image Editing System

Figure 5A:
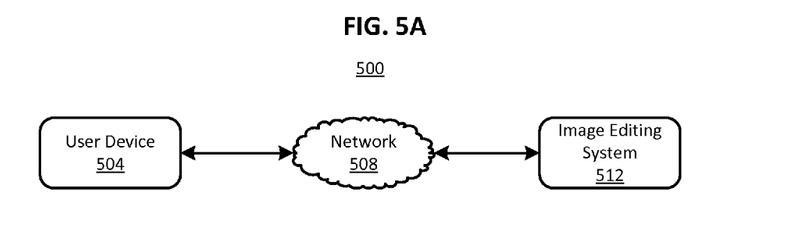
FIG. 5A is block diagram of a distributed processing environment that includes an image editing system remotely coupled to a computing device of a user by a communication network, in accordance with an embodiment of the present disclosure.

FIG. 5A is a block diagram of a distributed processing environment 500 that includes an image editing system 512 remotely coupled to a computing device of a user by a communication network, in accordance with an embodiment of the present disclosure. The system environment 500 shown in FIG. 5A includes a user device 504, a network 508, and an image editing system 512. In other embodiments, the system environment 500 includes different and/or additional components than those shown in FIG. 5A.

The user device 504 is a computing device capable of receiving user input as well as transmitting and/or receiving data via the network 508. In one embodiment, the user device 504 is a conventional computer system, such as a desktop or laptop computer. In another embodiment, the user device 504 may be a device having computer functionality, such as a personal digital assistant (PDA), mobile telephone, tablet computer, smartphone or similar device. In some embodiments, the user device 504 is a mobile computing device used for recording video content by a first user and an analogous mobile computing user device is used for viewing video content. The user device 504 is configured to communicate with the image editing system 512 via the network 508. In one embodiment, the user device 504 executes an application allowing a user of the user device 504 to interact with the image editing system 512, thus becoming a specialized computing machine. For example, the user device 504 executes a browser application to enable interaction between the user device 504 and the image editing system 512 via the network 508. In another embodiment, a user device 504 interacts with the image editing system 512 through an application programming interface (API) that runs on the native operating system of the user device 504, such as IOS® or ANDROID™.

The user device 504 is configured to communicate via the network 508, which may comprise any combination of local area and/or wide area networks, using both wired and wireless communication systems. In one embodiment, the network 508 uses standard communications technologies and/or protocols. Thus, the network 508 may include links using technologies that include Ethernet, 802.11, worldwide interoperability for microwave access (WiMAX), 3G, 4G, CDMA, digital subscriber line (DSL). Similarly, the networking protocols used on the network 508 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over the network 508 may be represented using technologies and/or formats including hypertext markup language (HTML) or extensible markup language (XML). In addition, all or some of links can be encrypted using conventional encryption technologies such as secure sockets layer (SSL), transport layer security (TLS), and Internet Protocol security (IPsec).

The image editing system 512, described below in the context of FIG. 5B in more detail, comprises one or more computing devices storing videos transmitted to the system by users via the network 508. The image editing system 512 is configured to, upon receiving of a source image file, perform the some or all of the embodiments described above to enable editing of the image using a plurality of layers and storing an identifier of a tool and the corresponding tool settings as metadata associated with the resulting target image file.

Figure 5B:
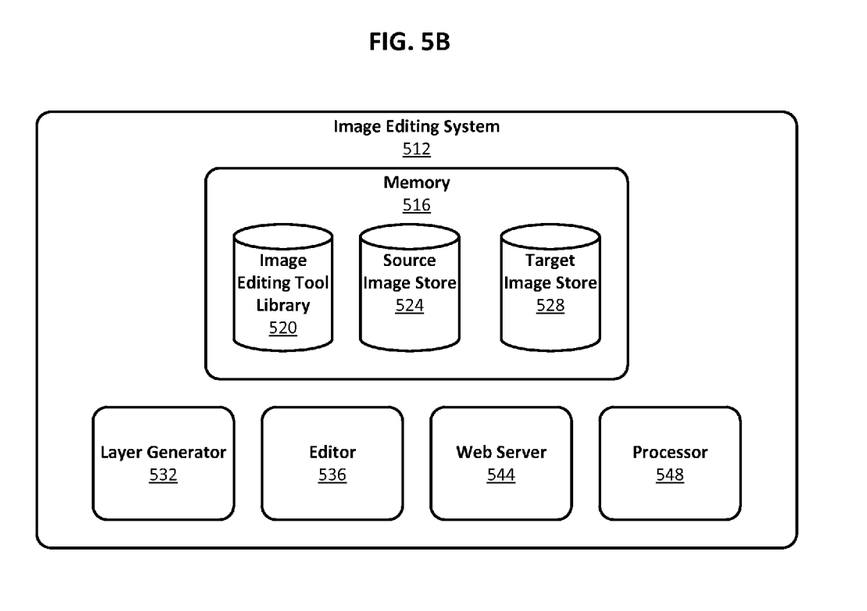
FIG. 5B is a block diagram of an image editing system configured to enable persistent tool settings, in accordance with an embodiment of the present disclosure.

FIG. 5B is a block diagram of a system architecture of the image editing system 512 as shown in FIG. 5A. The image editing system 512 includes memory 516, a layer generator 532, an editor 536, and a web server 544.

The memory 516 is depicted as including three distinct elements: an image editing tool library 520, a source image store 524, and a target image store 528. The image editing tool library 520 includes instructions and data stored in a non-transitory computer readable medium (which may include any suitable optical or magnetic durable storage device, e.g., RAM, ROM, Flash, USB drive, or other semi-conductor-based storage medium, a hard-drive, CD-ROM) that, when executed by one or more processors (e.g., processor 548), provides tools for the editing of images. As described above, each tool is associated with a plurality of tool settings that can be used to tailor the visual effect on the image imparted by the selected tool. For example, the image editing tool library 520 stores the selected tools used to edit a target image mentioned above in the context of FIGS. 4A-D. The image editing tool library 520 also stores at least the selected tool settings used to edit a target image and that are displayed in each of the tool summary in subsequent user sessions, as well as a full range of corresponding tool setting ranges. Furthermore, the image editing tool library 520 stores other tools and settings not shown in FIGS. 4A-D but available for selection.

The source image store 524 stores in memory source images received by the image editing system 512. The source image store 524 stores the source images for subsequent access by other elements of the system, such as the various editing elements presented below.

The target image store 528 stores in memory a source image in preparation for editing and subsequent to editing. That is, upon a source image being received into the source image store 524 of the image editing system 512, the target image store 528 communicates with the source image store 524 to copy, duplicate, or transfer the source image into the target image store 528 in preparation for editing. Once the source image is stored in the target image store 528, the operational elements (i.e., the layer generator 532, the editor 536, and the web server 544) of the image editing system 512 are engaged to edit the target image file. The target image store 528 also stores in memory any target source images that have been edited.

The layer generator 532 is used to generate a separate layer for some or all of the edits made to the target image stored in the target image store 528. As shown in FIGS. 4A-D and described above, visual effects made to a target image file can be done on distinct layers having a combination of transparent and non-transparent portions. These layers are then superimposed to compile the multiple edits made to the target image. While prior image editing applications supported only a small number of layers within any one target image file, embodiments of the present disclosure enable as many as 50 or 100 layers to be used to edit a target image.

The editor 536 of the image editing system 512 provides a user interface to the user device 504 that displays the various editing tools and corresponding tool settings selectable by a user. Upon selection of a tool and corresponding tool setting, the editor 536 receives (optionally through the web server 544, described below), instructions to edit a target image file. The editor 536 then applies the instructions as a visual effect to a specified layer of the target image file.

The editor 536 also annotates metadata of the target image file so as to record the tool identity and corresponding tool settings in the target image file for the layer and pixels affected by the applied visual effect. As described above, this enables the tool and tool settings to persist even after the target image file is closed and later reopened in a different user session. Upon opening a target image file in a subsequent user session, the editor 536 retrieves from the image editing tool library 520 the stored tool identifiers and corresponding tool settings for each previously edited layer. The retrieval may be facilitated through the web server 544 in some embodiments.

The web server 544 links the image editing system 512 to the user device 504 via the network 508. The web server 544 serves web pages, as well as other web-related content, such as JAVA®, FLASH®, XML and so forth. The web server 544 may provide the functionality of receiving source image files from a user device 504, receiving edits to target image files from the user device 504, and providing data to be rendered as an image corresponding to the target image file on the user device 504. Additionally, the web server 544 may provide application programming interface (API) functionality to send data directly to native client device operating systems, such as IOS®, ANDROID™, WEBOS® or RIM. The web server 544 also provides API functionality for exchanging data with the user device 504.

The image editing system 512 also includes at least one processor 548 for executing computer-readable and computer-executable instructions or software stored in the memory 516 or any of the modules of the image editing system 512. Virtualization may be employed so that infrastructure and resources in the image editing system 512 may be shared dynamically. For example, a virtual machine may be provided to handle a process running on multiple processors so that the process appears to be using only one computing resource rather than multiple computing resources. Multiple virtual machines may also be used with one processor.

As will be appreciated in light of this disclosure, the various modules and components of the system shown in FIGS. 5A and 5B, such as the layer generator 532 and editor 536, can be implemented in software, such as a set of instructions (e.g., HTML, XML, C, C++, object-oriented C, JavaScript, Java, BASIC.) encoded on any computer readable medium or computer program product (e.g., hard drive, server, disc, or other suitable non-transient memory or set of memories), that when executed by one or more processors, cause the various methodologies provided in this disclosure to be carried out. It will be appreciated that, in some embodiments, various functions performed by the user computing system, as described in this disclosure, can be performed by similar processors and/or databases in different configurations and arrangements, and that the depicted embodiments are not intended to be limiting.

Further Considerations

The foregoing description of the embodiments of the disclosure has been presented for the purpose of illustration; it is not intended to be exhaustive or to limit the claims to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. The described operations may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a non-transitory computer-readable medium containing computer program code, which can be executed by a computer processor for performing any or all of the steps, operations, or processes described.

Example Embodiment

One embodiment of the present disclosure is a method that includes receiving, in a second user session, an instruction to open a target image file previously edited in a first user session, the editing in the first user session performed with an image editing tool and at least one corresponding tool setting value. Responsive to the received instruction, the target image file is opened in the second user session. In the second user session an identifier corresponding to the image editing tool and the at least one corresponding tool setting value used during the first user session to edit the target image file are both retrieved. The identifier corresponding to the image editing tool and the at least one corresponding image editing tool setting value are presented for display in the second user session. In one example of this embodiment, an instruction to edit a subset of pixels in a layer of the target image file using the image editing tool and the at least one corresponding tool setting value from the first user session is received in the second user session. In one example of this embodiment, the followed are stored in the target image file during the first user session: pixel data corresponding to a subset of pixels edited using the image editing tool and the at least one corresponding tool setting value; an identifier of the layer and coordinates of pixels in the layer edited using the image editing tool and the at least one corresponding tool setting value; and the identifier of the image editing tool and the at least one corresponding tool setting value used to edit the subset of pixels on the identified layer. In the prior example, the identifier of the image editing tool and the at least one corresponding tool setting value are stored for each edited pixel of the target image file. In one example of this embodiment, the second user session includes generating a plurality of layers associated with the image of the target image file, receiving, for each layer of the plurality of layers, a selection of at least one image editing tool, and storing, for each layer of the plurality of layers, the corresponding selected at least one image editing tool with the target image file. In one example of the preceding example, the second user session is closed. In a third user session, the target image file previously edited in the second user session is opened. In the third user session, the selected at least one image editing tool for each layer of the plurality of layers is presented for display.

Other embodiments include computer program products and systems for executing the above method embodiment.

What is claimed is:

1. A method comprising:
   storing, during a first user session, in a target image file:
   data corresponding to a subset of pixels edited using an image editing tool and at least one corresponding tool setting value;

a correlation between (a) an identifier of a layer and (b) coordinates of pixels in the identified layer that were edited using the image editing tool and the at least one corresponding tool setting value; and an identifier of the image editing tool and the at least one corresponding tool setting value used to edit the subset of pixels in the identified layer;

receiving, in a second user session, an instruction to open the target image file previously edited in the first user session with the image editing tool and the at least one corresponding tool setting value;

responsive to the received instruction, opening the target image file in the second user session;

retrieving, in the second user session from the target image file, the identifier corresponding to the image editing tool and the at least one corresponding tool setting value used during the first user session to edit the target image file; and causing the identifier corresponding to the image editing tool and the at least one corresponding image editing tool setting value to be presented for display in the second user session.

2. The method of claim 1, further comprising:
receiving, in the second user session, an instruction to edit pixels in a layer of the target image file using the image editing tool and the at least one corresponding tool setting value from the first user session.

3. The method of claim 1, wherein the identifier of the image editing tool and the at least one corresponding tool setting value are stored for each edited pixel of the target image file.

4. The method of claim 1, further comprising, in the second user session:
generating a plurality of layers associated with the image of the target image file;
receiving, for each layer of the plurality of layers, a selection of at least one image editing tool; and
storing, for each layer of the plurality of layers, the corresponding selected at least one image editing tool with the target image file.

5. The method of claim 4, further comprising:
closing the second user session;
opening, in a third user session, the target image previously edited in the second user session; and
presenting for display in the third user session the selected at least one image editing tool for each layer of the plurality of layers.

6. A computer program product wherein the computer program product is stored on at least one non-transitory computer-readable medium that includes instructions that, when loaded into memory, cause at least one processor to perform a method, the method comprising:
storing, during a first user session, in a target image file:
data corresponding to a subset of pixels edited using an image editing tool and at least one corresponding tool setting value;
a correlation between (a) an identifier of a layer and (b) coordinates of pixels in the identified layer that were edited using the image editing tool and the at least one corresponding tool setting value; and
the identifier of the image editing tool and the at least one corresponding tool setting value used to edit the subset of pixels in the identified layer;
receiving, in a second user session, an instruction to open the target image file previously edited in the first user session with the image editing tool and the at least one corresponding tool setting value;

responsive to the received instruction, opening the target image file in the second user session;

retrieving, in the second user session from the target image file, the identifier corresponding to the image editing tool and the at least one corresponding tool setting value used during the first user session to edit the target image file; and causing the identifier corresponding to the image editing tool and the at least one corresponding image editing tool setting value to be presented for display in the second user session.

7. The computer program product of claim 6, further comprising:
receiving, in the second user session, an instruction to edit pixels in a layer of the target image file using the image editing tool and the at least one corresponding tool setting value from the first user session.

8. The computer program product of claim 6, wherein the identifier of the image editing tool and the at least one corresponding tool setting value are stored for each edited pixel of the target image file.

9. The computer program product of claim 6, further comprising, in the second user session:
generating a plurality of layers associated with the image of the target image file;
receiving, for each layer of the plurality of layers, a selection of at least one image editing tool; and
storing, for each layer of the plurality of layers, the corresponding selected at least one image editing tool with the target image file.

10. The computer program product of claim 9, further comprising:
closing the second user session;
opening, in a third user session, the target image previously edited in the second user session; and
presenting for display in the third user session the selected at least one image editing tool for each layer of the plurality of layers.

11. A system comprising:
a target image store configured for:
receiving, in a second user session, an instruction to open a target image file previously edited in a first user session, the editing in the first user session performed with an image editing tool and at least one corresponding tool setting value; and
responsive to the received instruction, opening the target image file in the second user session;
an editor configured for:
retrieving, in the second user session from the target image store, an identifier corresponding to the image editing tool and the at least one corresponding tool setting value used during the first user session to edit the target image file; and
causing the identifier corresponding to the image editing tool and the at least one corresponding image editing tool setting value to be presented for display in the second user session; and
an image editing tool library configured for storing:
a correlation between (a) an identifier of a layer and (b) coordinates of pixels in the identified layer that were edited using the image editing tool and the at least one corresponding tool setting value; and
the identifier of the image editing tool and the at least one corresponding tool setting value used to edit a subset of pixels in the identified layer.

12. The system of claim 11, wherein the editor is further configured for receiving, in the second user session, an instruction to edit a subset of pixels in a layer of the target image file using the image editing tool and the at least one corresponding tool setting value from the first user session.

13. The system of claim 11, wherein the identifier of the image editing tool and the at least one corresponding tool setting value are stored by the image editing tool library for each edited pixel of the target image file.

14. The system of claim 11, wherein the target image store is further configured for storing data corresponding to a subset of pixels edited using the image editing tool and the at least one corresponding tool setting value.

15. The system of claim 11, wherein the target image store is further configured for generating a plurality of layers associated with the image of the target image file.

16. The system of claim 15, wherein the editor is further configured for:
- receiving, for each layer of the plurality of layers, a selection of at least one image editing tool; and
- storing, for each layer of the plurality of layers, the corresponding selected at least one image editing tool with the target image file.

\* \* \* \* \*